(12) United States Patent
Fattal

(10) Patent No.: US 11,526,008 B2
(45) Date of Patent: Dec. 13, 2022

(54) MULTIBEAM ELEMENT-BASED HEAD-UP DISPLAY, SYSTEM, AND METHOD

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 293 days.

(21) Appl. No.: 16/900,908

(22) Filed: Jun. 13, 2020

(65) Prior Publication Data

US 2020/0310115 A1    Oct. 1, 2020

Related U.S. Application Data

(63) Continuation of application No. PCT/US2017/067130, filed on Dec. 18, 2017.

(51) Int. Cl.
  *G02B 27/01* (2006.01)
  *G02B 30/33* (2020.01)
  (Continued)

(52) U.S. Cl.
  CPC ......... *G02B 27/0101* (2013.01); *B60K 35/00* (2013.01); *G02B 6/005* (2013.01);
  (Continued)

(58) Field of Classification Search
  CPC .. G02B 27/0101; G02B 6/005; G02B 6/0051; G02B 30/33; G02B 30/34;
  (Continued)

(56) References Cited

U.S. PATENT DOCUMENTS 4,711,512 A * 12/1987 Upatnieks .......... G02B 27/4272
  359/15
5,475,512 A   12/1995 Nakazawa et al.
  (Continued)

FOREIGN PATENT DOCUMENTS

CN    104035198 A    9/2014
JP    2007292956 A    11/2007
  (Continued)

OTHER PUBLICATIONS

International Search Report (ISRWO) by International Searching Authority (ISA) Korean Intellectual Property Office (KIPO) dated Sep. 19, 2018 (14 pages) for counterpart PCT Application PCT/US2017/067130.

(Continued)

*Primary Examiner* — Brent D Castiaux
(74) *Attorney, Agent, or Firm* — J. Michael Johnson

(57) ABSTRACT

A head-up display and a multiview head-up display system provide a plurality of different views of a multiview image combined with a view of a physical environment to an eye box as a combined view. The head-up display includes a multibeam element-based display configured to provide the different views of the multiview image and an optical combiner configured to relay the different views to the eye box along with the view of the physical environment view. The multibeam element-based display includes an array of multibeam elements configured to provide a plurality of directional light beams having directions corresponding to respective view directions of the plurality of different views and an array of light valves configured to modulate the plurality of directional light beams to provide the multiview image.

19 Claims, 11 Drawing Sheets

(51) Int. Cl.
*F21V 8/00* (2006.01)
*B60K 35/00* (2006.01)

(52) U.S. Cl.
CPC ...... *G02B 30/33* (2020.01); *B60K 2370/1529* (2019.05); *B60K 2370/336* (2019.05); *G02B 2027/0134* (2013.01)

(58) Field of Classification Search
CPC .... G02B 2027/0134; G02B 2027/0123; G02B 2027/0118; B60K 35/00; B60K 2370/1529; B60K 2370/336
See application file for complete search history.

(56) References Cited

U.S. PATENT DOCUMENTS

| | | | |
|---|---|---|---|
| 5,497,170 | A | 3/1996 | Kato et al. |
| 7,425,069 | B2 | 9/2008 | Schwerdtner et al. |
| 7,876,397 | B2 | 1/2011 | Krijn et al. |
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 10,649,128 | B2 | 5/2020 | Fattal et al. |
| 2002/0141056 | A1* | 10/2002 | Kobayashi ........... H04N 13/346 348/E13.059 |
| 2011/0193508 | A1 | 8/2011 | Oomori |
| 2011/0235179 | A1 | 9/2011 | Simmonds |
| 2012/0062850 | A1 | 3/2012 | Travis |
| 2012/0236403 | A1 | 9/2012 | Sykora et al. |
| 2013/0021392 | A1 | 1/2013 | Travis |
| 2013/0201094 | A1 | 8/2013 | Travis et al. |
| 2013/0229712 | A1 | 9/2013 | Kress |
| 2013/0329301 | A1 | 12/2013 | Travis |
| 2014/0211146 | A1 | 7/2014 | Gupta et al. |
| 2015/0226965 | A1 | 8/2015 | Kim et al. |
| 2015/0370075 | A1 | 12/2015 | Ato et al. |
| 2016/0033705 | A1* | 2/2016 | Fattal ................... G02B 6/0031 359/462 |
| 2017/0363794 | A1 | 12/2017 | Wan et al. |
| 2018/0196194 | A1 | 7/2018 | Fattal |
| 2018/0246330 | A1 | 8/2018 | Fattal |
| 2018/0292647 | A1 | 10/2018 | Fattal |
| 2018/0299608 | A1 | 10/2018 | Fattal et al. |
| 2018/0306965 | A1 | 10/2018 | Fattal |
| 2019/0155105 | A1 | 5/2019 | Aieta et al. |

FOREIGN PATENT DOCUMENTS

| | | |
|---|---|---|
| JP | 2011073496 A | 4/2011 |
| JP | 2015087698 A | 5/2015 |
| KR | 100820898 A1 | 9/2014 |
| WO | 2012038856 A1 | 3/2012 |
| WO | 2014051623 A1 | 4/2014 |
| WO | 2017123259 A1 | 7/2017 |
| WO | 2017213676 A1 | 12/2017 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

MULTIBEAM ELEMENT-BASED HEAD-UP DISPLAY, SYSTEM, AND METHOD

CROSS-REFERENCE TO RELATED APPLICATIONS

This application is a continuation application of and claims the benefit of priority to prior International Application No. PCT/US2017/067130, filed Dec. 18, 2017, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

A head-up display is an electronic display that displays an image or more generally information in a manner that may be viewed simultaneously while viewing a physical environment beyond the head-up display. In particular, the head-up display creates a combined view that superimposes the image generated by the head-up display and the physical environment view. Moreover, a user may view the head-up display in a so-called 'head-up' configuration (e.g., without having to look down or away from the physical environment view). Various head-up displays and head-up display systems may provide a more immersive experience than conventional displays in many applications.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Embodiments and examples in accordance with the principles described herein provide a head-up image display. In particular, according to various embodiments of the principles described herein, a head-up display employs a multibeam element-based display to produce a plurality of different views of a multiview image. The plurality of different views are projected or mapped into an eye box at which the multiview image is to be viewed. In addition, the head-up display provides a superposition of a view of a physical environment and the multiview image comprising the different views. The different views may include different perspective views of a three-dimensional (3D) scene or similar content, according to various embodiments. The different views of the multiview image may enable a user to perceive elements within the multiview image at different apparent depths within the physical environment aiding the user with accommodation, for example.

Herein a 'two-dimensional display' or '2D display' is defined as a display configured to provide a view of an image that is substantially the same regardless of a direction from which the image is viewed (i.e., within a predefined viewing angle or range of the 2D display). A liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. In some instances, a multiview display may also be referred to as a three-dimensional (3D) display, e.g., when simultaneously viewing two different views of the multiview image provides a perception of viewing a three dimensional image.

Figure 1A:
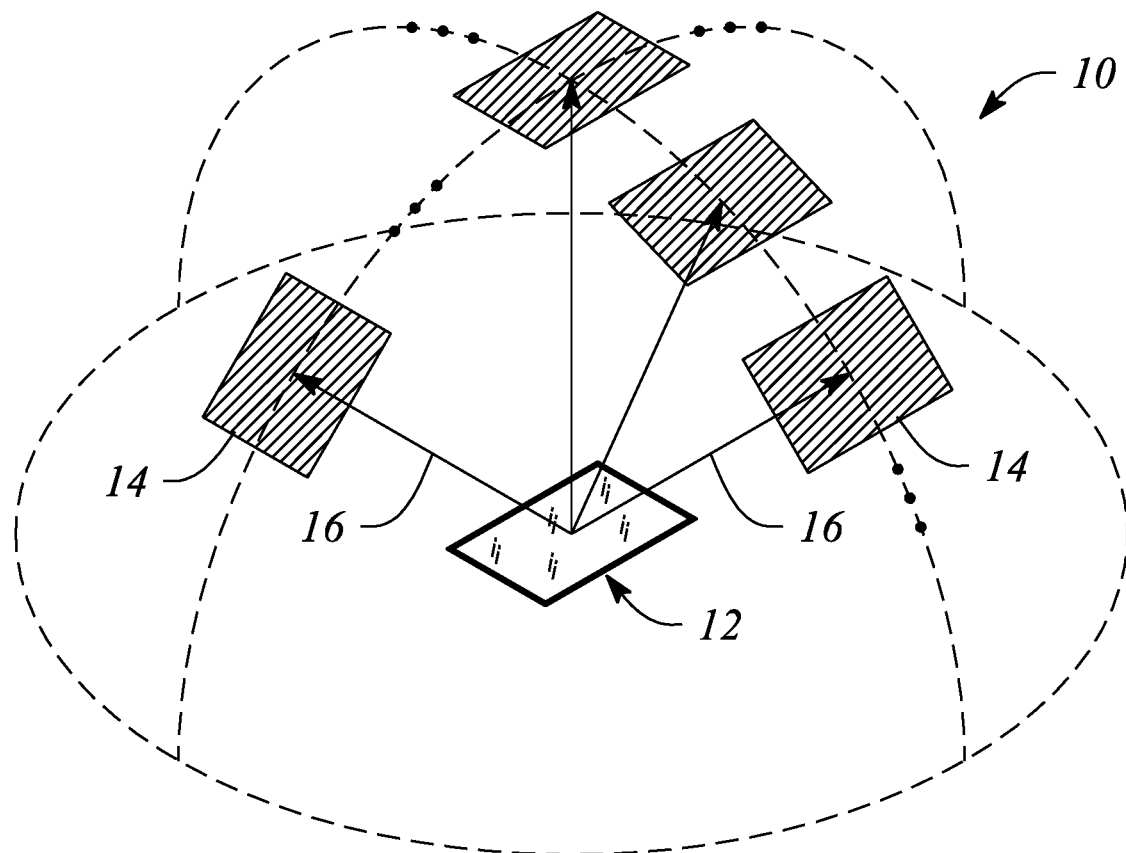
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 to display or provide a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
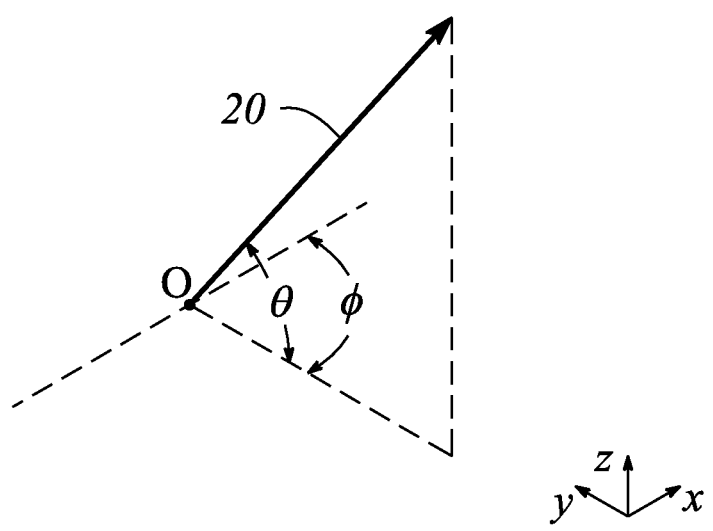
FIG. 1B illustrates a graphical representation of the angular components of a light beam having a particular principal angular direction of a multiview display in an example, according to an embodiment consistent with the principles described herein.

FIG. 1B illustrates a graphical representation of the angular components $\{\theta, \phi\}$ of a light beam 20 having a particular principal angular direction or simply 'direction' corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels or 'view' pixels in each of a similar plurality of different views of a multiview display. In particular, a multiview pixel may have an individual view pixels corresponding to or representing a view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels located at $\{x_1, y_1\}$ in each of the different views of a multiview image, while a second multiview pixel may have individual view pixels located at $\{x_2, y_2\}$ in each of the different views, and so on.

In some embodiments, a number of view pixels in a multiview pixel may be equal to a number of different views of the multiview display. For example, the multiview pixel may provide sixty-four (64) view pixels in associated with a multiview display having 64 different views. In another example, the multiview display may provide an eight by four array of views (i.e., 32 views) and the multiview pixel may include thirty-two (32) view pixels (i.e., one for each view). Additionally, each different view pixel may have an associated direction (e.g., light beam direction) that corresponds to a different one of the view directions corresponding to the 64 different views, for example. Further, according to some embodiments, a number of multiview pixels of the multiview display may be substantially equal to a number of pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = a \cdot \sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread a (e.g., $\sigma_s \approx \sigma$). A uniform diffraction grating (i.e., a diffraction grating having a substantially uniform or constant diffractive feature spacing or grating pitch) is an example of an angle-preserving scattering feature. In contrast, a Lambertian scatterer or a Lambertian reflector as well as a general diffuser (e.g., having or approximating Lambertian scattering) are not angle-preserving scatterers, by definition herein.

Herein, a 'polarization-preserving scattering feature' or equivalently a 'polarization-preserving scatterer' is any feature or scatterer configured to scatter light in a manner that substantially preserves in scattered light a polarization or at least a degree of polarization of the light incident on the feature or scatterer. Accordingly, a 'polarization-preserving scattering feature' is any feature or scatterer where a degree of polarization of a light incident on the feature or scatterer is substantially equal to the degree of polarization of the scattered light. Further, by definition, 'polarization-preserving scattering' is scattering (e.g., of guided light) that preserves or substantially preserves a predetermined polarization of the light being scattered. The light being scattered may be polarized light provided by a polarized light source, for example.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}(n \sin \theta_i - m\lambda/d) \quad (1)$$

where $\lambda$ is a wavelength of the light, m is a diffraction order, n is an index of refraction of a light guide, d is a distance or spacing between features of the diffraction grating, $\lambda_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
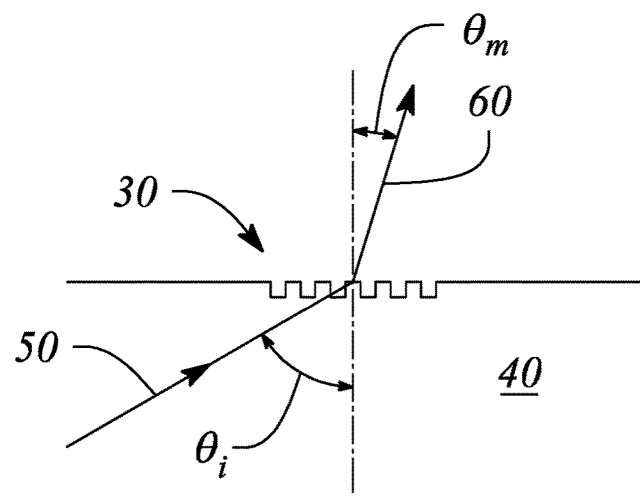
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The incident light beam 50 may be a beam of guided light (i.e., a guided light beam) within the light guide 40. Also illustrated in FIG. 2 is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example diffraction order m=1 (i.e., a first diffraction order).

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling or scattering out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality. As such, the light beam is referred to as a 'directional light beam' and the light beam plurality may be termed a 'directional light beam plurality, by definition herein.

Furthermore, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various directional light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a directional light beam produced by the multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, a diffraction grating, a tapered light guide, and various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or similar collimating characteristic in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example. A 'polarized' light source is defined herein as substantially any light source that produces or provides light having a predetermined polarization. For example, the polarized light source may comprise a polarizer at an output of an optical emitter of the light source.

The term 'accommodation' as employed herein refers to a process of focusing upon an object or image element by changing an optical power of the eye. In other words, accommodation is the ability of the eye to focus. Herein, 'accommodation range' or equivalently 'accommodation distance' is defined as a range of distance from the eye at which focus may be achieved. While accommodation range may vary from one individual to another, herein a minimum 'normal' accommodation distance of about twenty-five (25) centimeters (cm) is assumed, for example, by way of simplicity and not by way of limitation. As such, for an object to be within a so-called 'normal accommodation range, the object is generally understood to be located greater than about 25 cm from the eye.

Herein, 'eye box' is defined as a region or volume of space in which an image formed by a display or other optical system (e.g., lens system) may be viewed. In other words, the eye box defines a location in space within which a user's eye may be placed in order to view an image produced by the display system. In some embodiments, the eye box may represent a two dimensional region of space (e.g., a region with length and width but without substantial depth), while in other embodiments, the eye box may include a three-dimensional region of space (e.g., a region with length, width and depth). Further, while referred to as a 'box', the eye box may not be restricted to a box that rectangular in shape. For example, the eye box may comprise a cylindrical region of space, in some embodiments.

Further, as used herein, the article 'a' is intended to have its ordinary meaning in the patent arts, namely 'one or more'. For example, 'a multibeam element' means one or more multibeam elements and as such, 'the multibeam element' means 'the multibeam element(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3:
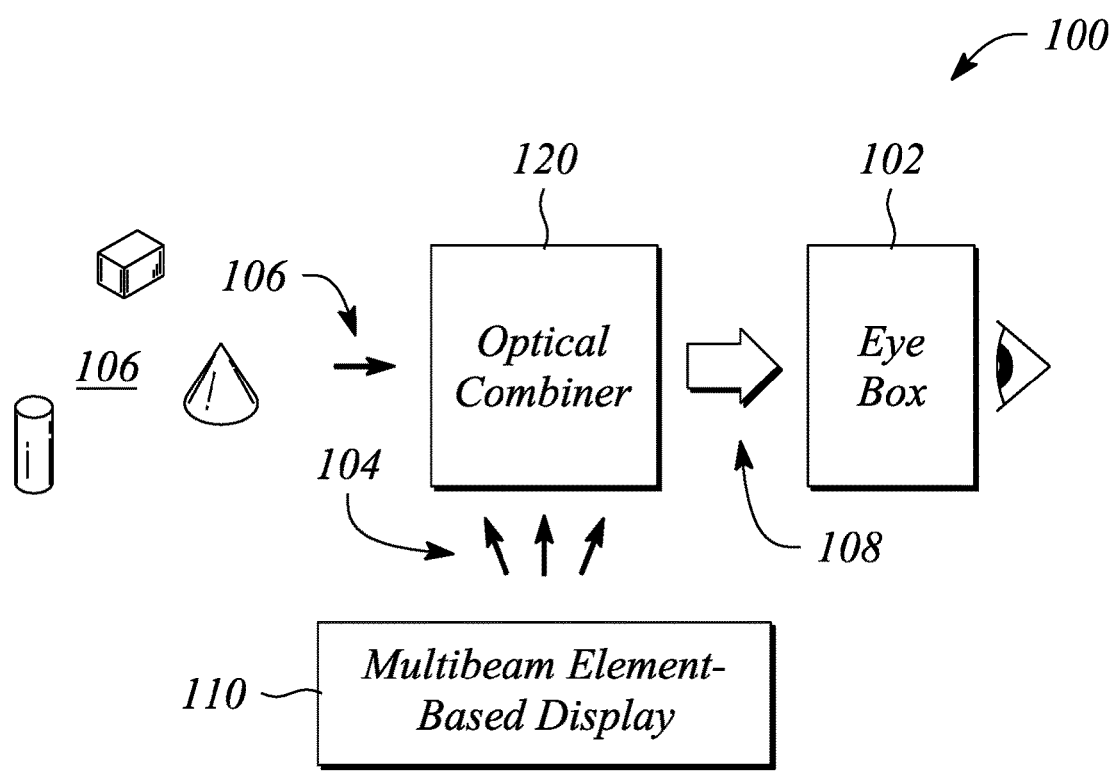
FIG. 3 illustrates a block diagram of a head-up display in an example, according to an embodiment consistent with the principles described herein.

According to some embodiments of the principles described herein, a head-up display is provided. FIG. 3 illustrates a block diagram of a head-up display 100 in an example, according to an embodiment consistent with the principles described herein. The head-up display 100 is configured to provide an image (i.e., displayed image) at an eye box 102 of the head-up display 100. In particular, the head-up display 100 may be configured to provide a multiview image comprising a plurality of different views 104, each view having a respective view direction.

In some embodiments, the different views 104 of the multiview image may be provided at different locations within the eye box 102. According to various embodiments, the different views 104 provided at different locations within the eye box 102 are configured to impart focus depth cues to a user of the head-up display 100. The focus depth cues may enable the user to perceive depth or distance within the displayed image based on the focus depth cues, for example. The focus depth cues imparted to a user by the head-up display 100 may include, but are not limited to, accommodation and retinal blurring.

As illustrated in FIG. 3, the head-up display 100 comprises a multibeam element-based display 110. The multibeam element-based display 110 is configured to provide the plurality of different views 104 of the multiview image being displayed. According to various embodiments, substantially any number of different views may be provided as the plurality of different views 104. For example, the plurality of different views 104 of the displayed image may include two, three, four, five, six, seven, eight or more different views. In other examples, the plurality of different views 104 of the displayed image includes a relatively large number of different views up to and including, but not limited to, sixteen (16), thirty-two (32), sixty-four (64), one hundred twenty-eight (128), or two hundred fifty-six (256) different views. In some embodiments, the plurality of different views 104 includes at least four different views.

In some examples, the multiview image provided or displayed by the head-up display 100 comprises only three-dimensional (3D) information or content (e.g., a 3D image representing a 3D object or scene). In other examples, the multiview image may include portions that provide 3D content along with portion that include two-dimensional (2D) information or content (e.g., 2D image portions). When the multiview image comprises 3D content or equivalently a '3D image,' the plurality of different views 104 may represent different perspective views of the 3D image. According to the principles described herein, the different views may enhance a user's perception of depth within the displayed image through one or both of retinal blurring and accommodation, for example. Moreover, the head-up display 100 may be or function as an autostereoscopic or 'holographic' multiview display (i.e., a so-called 'glasses-free' 3D or multiview display), according to some embodiments.

According to various embodiments, the multibeam element-based display 110 of the head-up display 100 comprises an array of multibeam elements. The multibeam element array is configured to provide a plurality of directional light beams having directions corresponding to respective view directions of the plurality of different views of the multiview image. The multibeam element-based display 110 of the head-up display 100 further comprises an array of light valves configured to modulate the plurality of directional light beams to provide the multiview image, according to various embodiments.

Figure 4A:
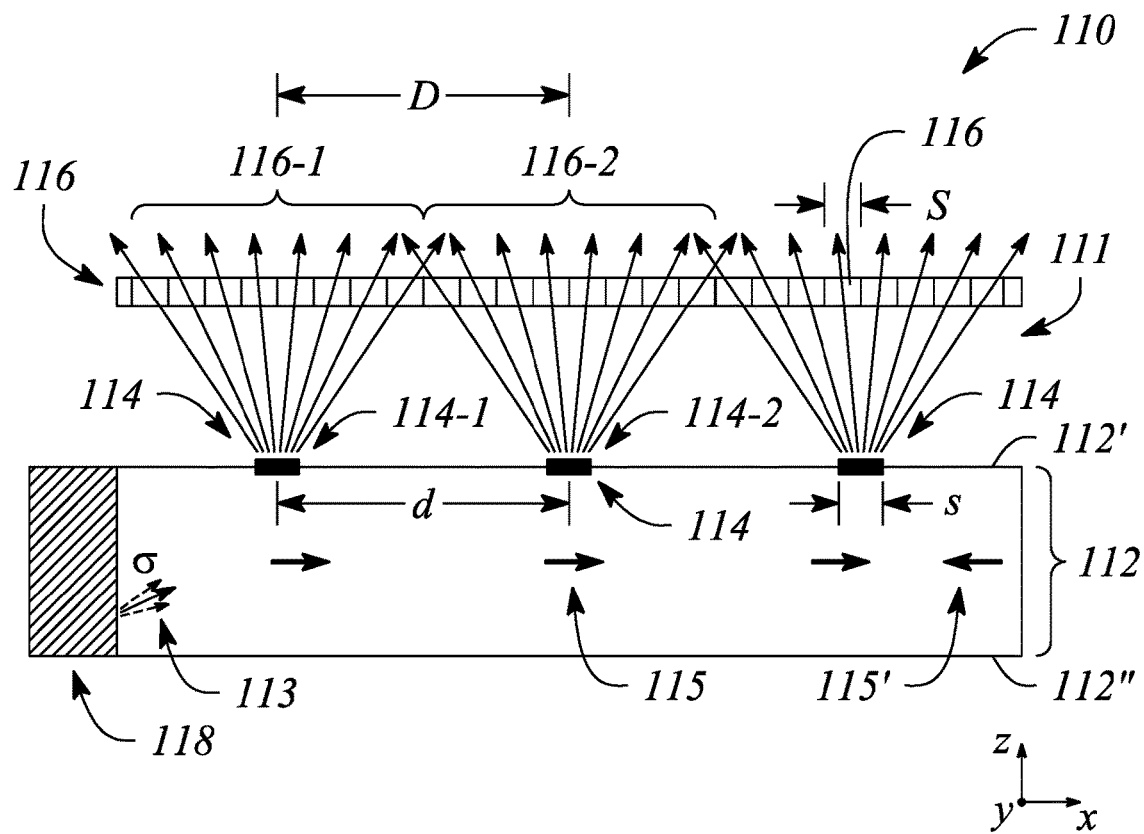
FIG. 4A illustrates a cross sectional view of a multibeam element-based display in an example, according to an embodiment consistent with the principles described herein.
Figure 4B:
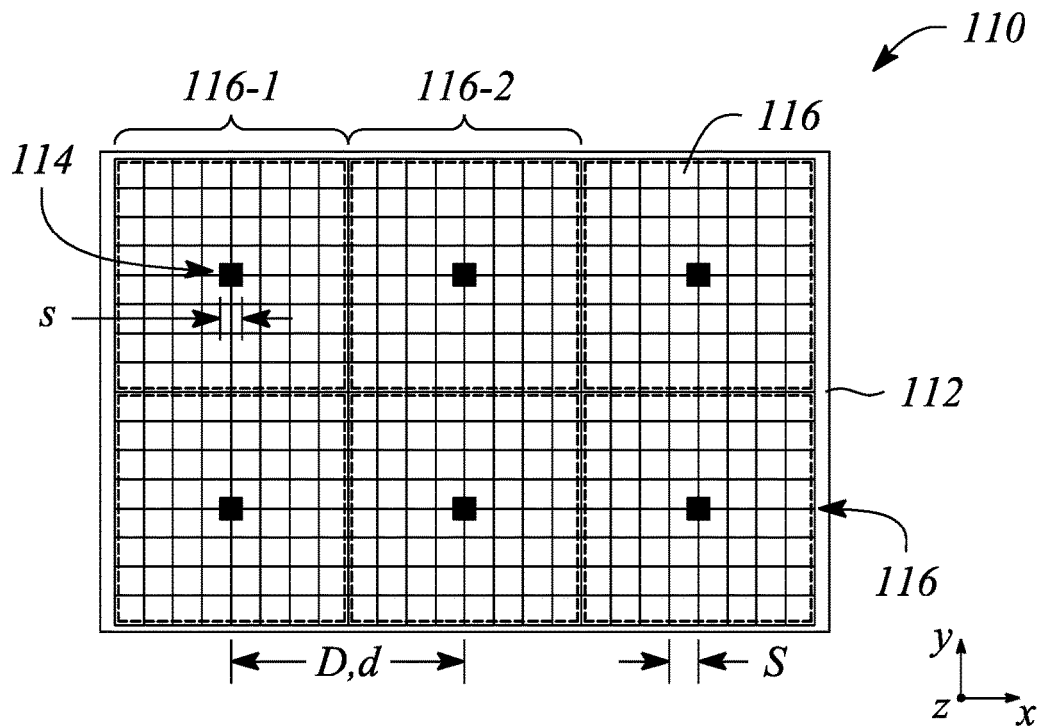
FIG. 4B illustrates a plan view of a multibeam element-based display in an example, according to an embodiment consistent with the principles described herein.
Figure 4C:
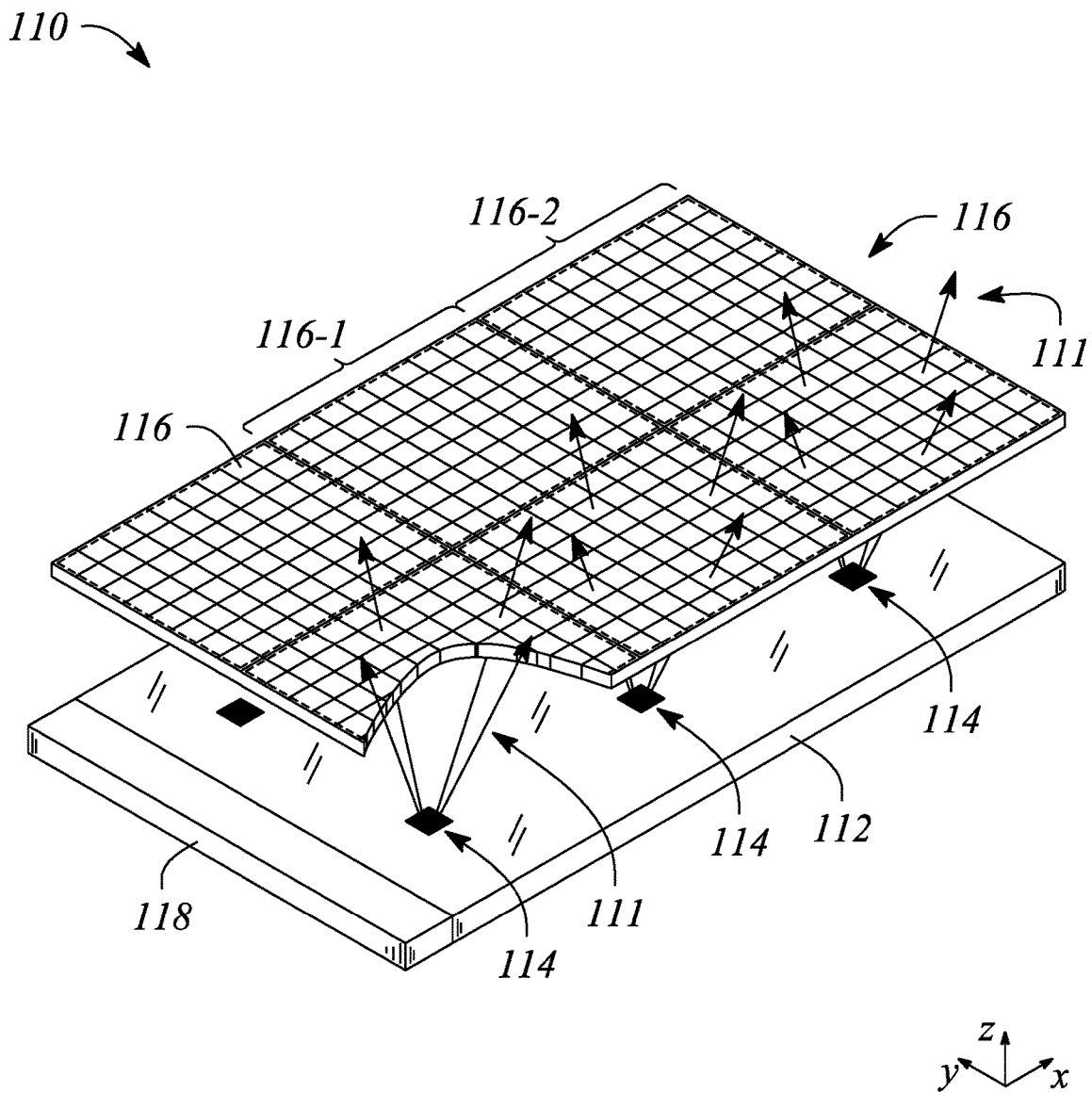
FIG. 4C illustrates a perspective view of a multibeam element-based display in an example, according to an embodiment consistent with the principles described herein.

FIG. 4A illustrates a cross sectional view of a multibeam element-based display 110 in an example, according to an embodiment consistent with the principles described herein. FIG. 4B illustrates a plan view of a multibeam element-based display 110 in an example, according to an embodiment consistent with the principles described herein. FIG. 4C illustrates a perspective view of a multibeam element-based display 110 in an example, according to an embodiment consistent with the principles described herein. The perspective view in FIG. 4C is illustrated with a partial cut-away to facilitate discussion herein only.

The multibeam element-based display 110 illustrated in FIGS. 4A-4C is configured to provide a plurality of directional light beams 111 having different principal angular directions from one another (e.g., a light field). In particular, the provided plurality of directional light beams 111 are directed away from the multibeam element-based display 110 in different principal angular directions corresponding to respective view directions of the plurality of different views 104, according to various embodiments. Further, the directional light beams 111 are modulated (e.g., using light valves, as described below) to provide or display the multiview image. In some embodiments, the multiview image may include 3D content (e.g., virtual objects represented in different perspective views that appear as 3D objects when viewed by a user).

As illustrated in FIGS. 4A-4C, the multibeam element-based display 110 comprises a light guide 112. The light guide 112 may be a plate light guide, according to some embodiments. The light guide 112 is configured to guide light along a length of the light guide 112 as guided light 113. For example, the light guide 112 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 113 according to one or more guided modes of the light guide 112, for example.

In particular, the light guide 112 may be a slab or plate optical waveguide comprising an extended, substantially planar sheet of optically transparent, dielectric material. The substantially planar sheet of dielectric material is configured to guide the guided light 113 using total internal reflection. According to various examples, the optically transparent material of the light guide 112 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 112 may further include a cladding layer (not illustrated) on at least a portion of a surface (e.g., one or both of the top surface and the bottom surface) of the light guide 112. The cladding layer may be used to further facilitate total internal reflection, according to some examples.

Further, according to some embodiments, the light guide 112 is configured to guide the guided light 113 according to total internal reflection at a non-zero propagation angle between a first surface 112' (e.g., 'front' surface or side) and a second surface 112" (e.g., 'back' surface or side) of the light guide 112. In particular, the guided light 113 propagates by reflecting or 'bouncing' between the first surface 112' and the second surface 112" of the light guide 112 at the non-zero propagation angle. In some embodiments, the guided light 113 comprises a plurality of guided light beams of different colors of light. The light beams of the plurality of guided light beams may be guided by the light guide 112 at respective ones of different color-specific, non-zero propagation angles. Note that the non-zero propagation angle is not illustrated for simplicity of illustration. However, a bold arrow depicting a propagation direction 115 illustrates a general propagation direction of the guided light 113 along the light guide length in FIG. 4A.

As defined herein, a 'non-zero propagation angle' is an angle relative to a surface (e.g., the first surface 112' or the second surface 112") of the light guide 112. Further, the non-zero propagation angle is both greater than zero and less than a critical angle of total internal reflection within the light guide 112, according to various embodiments. For example, the non-zero propagation angle of the guided light 113 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 112.

The guided light 113 in the light guide 112 may be introduced or coupled into the light guide 112 at the non-zero propagation angle (e.g., about 30-35 degrees). One or more of a lens, a mirror or similar reflector (e.g., a tilted collimating reflector), a diffraction grating, and a prism (not illustrated) may facilitate coupling light into an input end of the light guide 112 as the guided light 113 at the non-zero propagation angle, for example. Once coupled into the light guide 112, the guided light 113 propagates along the light guide 112 in a direction that may be generally away from the input end (e.g., illustrated by bold arrows pointing along an x-axis in FIG. 4A).

Further, the guided light 113 or equivalently the guided light 113 produced by coupling light into the light guide 112 may be a collimated light beam, according to various embodiments. Herein, a 'collimated light' or 'collimated light beam' is generally defined as a beam of light in which rays of the light beam are substantially parallel to one another within the light beam (e.g., the guided light 113). Further, rays of light that diverge or are scattered from the collimated light beam are not considered to be part of the collimated light beam, by definition herein. In some embodiments, the multibeam element-based display 110 may include a collimator, such as, but not limited to, a lens, reflector or mirror, a diffraction grating, or a tapered light guide, configured to collimate the light, e.g., from a light source. In some embodiments, the light source comprises a collimator. The collimated light provided to the light guide 112 is a collimated guided light 113. The guided light 113 may be collimated according to or having a collimation factor σ, in various embodiments.

In some embodiments, the light guide 112 may be configured to 'recycle' the guided light 113. In particular, the guided light 113 that has been guided along the light guide length may be redirected back along that length in another propagation direction 115' that differs from the propagation direction 115. For example, the light guide 112 may include a reflector (not illustrated) at an end of the light guide 112 opposite to an input end adjacent to the light source. The reflector may be configured to reflect the guided light 113 back toward the input end as recycled guided light. Recycling guided light 113 in this manner may increase a brightness of the multibeam element-based display 110 (e.g., an intensity of the directional light beams 111) by making guided light available more than once, for example, to multibeam elements, described below.

In FIG. 4A, a bold arrow indicating a propagation direction 115' of recycled guided light (e.g., directed in a negative x-direction) illustrates a general propagation direction of the recycled guided light within the light guide 112. Alternatively (e.g., as opposed to recycling guided light), guided light 113 propagating in the other propagation direction 115' may be provided by introducing light into the light guide 112 with the other propagation direction 115' (e.g., in addition to guided light 113 having the propagation direction 115).

As illustrated in FIGS. 4A-4C, the multibeam element-based display 110 further comprises a plurality or an array of multibeam elements 114 spaced apart from one another along the light guide length. In particular, the multibeam elements 114 of the array of multibeam elements 114 (or multibeam element array) are separated from one another by a finite space and represent individual, distinct elements along the light guide length. That is, by definition herein, the multibeam elements 114 of the multibeam element array are spaced apart from one another according to a finite (i.e., non-zero) inter-element distance (e.g., a finite center-to-center distance). Further the multibeam elements 114 of the multibeam element array generally do not intersect, overlap or otherwise touch one another, according to some embodiments. That is, each multibeam element 114 of the multibeam element array is generally distinct and separated from other ones of the multibeam elements 114.

According to some embodiments, the multibeam elements 114 of the multibeam element array may be arranged in either a one-dimensional (1D) array or two-dimensional (2D) array. For example, the array of multibeam elements 114 may be arranged as a linear 1D array. In another example, the array of multibeam elements 114 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 114 may be substantially uniform or constant across the array. In other examples, the inter-element distance between the multibeam elements 114 may be varied one or both of across the array and along the length of the light guide 112.

According to various embodiments, a multibeam element 114 of the multibeam element array is configured to couple or scatter out a portion of the guided light 113 as the plurality of directional light beams 111. In particular, FIGS. 4A and 4C illustrate the directional light beams 111 as a plurality of diverging arrows depicted as being directed way from the first (or front) surface 112' of the light guide 112. Further, a size of the multibeam element 114 is comparable to a size of a view pixel (or equivalently a size of a light valve 116, described below) in a multiview pixel, of the multibeam element-based display 110, according to various embodiments.

Herein, the 'size' may be defined in any of a variety of manners to include, but not be limited to, a length, a width or an area. For example, the size of a view pixel may be a length thereof and the comparable size of the multibeam element 114 may also be a length of the multibeam element 114. In another example, size may refer to an area such that an area of the multibeam element 114 may be comparable to an area of the view pixel.

In some embodiments, the size of the multibeam element 114 is comparable to the view pixel size such that the multibeam element size is between about fifty percent (50%) and about two hundred percent (200%) of the view pixel size. For example, if the multibeam element size is denoted 's' and the view pixel size is denoted 'S' (e.g., as illustrated in FIG. 4A), then the multibeam element size s may be given by equation (2) as $$½S ≤ s ≤ 2S \qquad (2)$$

In other examples, the multibeam element size is greater than about sixty percent (60%) of the view pixel size, or about seventy percent (70%) of the view pixel size, or greater than about eighty percent (80%) of the view pixel size, or greater than about ninety percent (90%) of the view pixel size, and the multibeam element is less than about one hundred eighty percent (180%) of the view pixel size, or less than about one hundred sixty percent (160%) of the view pixel size, or less than about one hundred forty percent (140%) of the view pixel size, or less than about one hundred twenty percent (114%) of the view pixel size. For example, by 'comparable size', the multibeam element size may be between about seventy-five percent (75%) and about one hundred fifty (150%) of the view pixel size. In another example, the multibeam element 114 may be comparable in size to the view pixel where the multibeam element size is between about one hundred twenty-five percent (125%) and about eighty-five percent (85%) of the view pixel size. According to some embodiments, the comparable sizes of the multibeam element 114 and the view pixel (or light valve 116) may be chosen to reduce, or in some examples to minimize, dark zones between views of the multiview image, while at the same time reducing, or in some examples minimizing, an overlap between different views of the multiview image.

As illustrated in FIGS. 4A-4C, the multibeam element-based display 110 further comprises an array of light valves 116. The array of light valves 116 is configured to modulate the directional light beams 111 of the directional light beam plurality. In particular, the light valve array may be configured to modulate the directional light beams 111 as or to provide an image being displayed by the multibeam element-based display 110, such as the multiview image. In FIG. 4C, the array of light valves 116 is partially cut-away to allow visualization of the light guide 112 and the multibeam element 114 underlying the light valve array.

Further, different ones of the directional light beams 111 having different principal angular directions are configured to pass through and thus be modulated by different ones of the light valves 116 in the light valve array. Further, as illustrated, a light valve 116 of the array corresponds to a view pixel, while a set of the light valves 116 of the light valve array corresponds to a multiview pixel of the multibeam element-based display 110. In particular, a different set of light valves 116 of the light valve array is configured to receive and modulate the directional light beams 111 from different ones of the multibeam elements 114. Thus, as illustrated, there is one unique set of light valves 116 for each multibeam element 114. In various embodiments, any of a variety of different types of light valves may be employed as the light valves 116 of the light valve array including, but not limited to, one or more of liquid crystal light valves, electrophoretic light valves, and light valves based on or employing electrowetting.

FIG. 4A illustrates a first light valve set 116-1 configured to receive and modulate the directional light beams 111 from a first multibeam element 114-1, while a second light valve set 116-2 is configured to receive and modulate the directional light beams 111 from a second multibeam element 114-2, as illustrated. Thus, each of the light valve sets (e.g., the first and second light valve sets 116-1, 116-2) in the light valve array corresponds, respectively, to a different multiview pixel, with individual light valves 116 of the light valve sets corresponding to the view pixels of the respective multiview pixels, as illustrated in FIG. 4A.

Note that, in FIG. 4A, the size of a view pixel may correspond to an actual size of a light valve 116 in the light valve array. In other examples, the view pixel size or equivalently the light valve size may be defined as a distance (e.g., a center-to-center distance) between adjacent light valves 116 of the light valve array. For example, the light valves 116 may be smaller than the center-to-center distance between the light valves 116 in the light valve array. The view pixel or light valve size may be defined as either the size of the light valve 116 or a size corresponding to the center-to-center distance between the light valves 116, for example.

In some embodiments, a relationship between the multibeam elements 114 of the multibeam element array and corresponding multiview pixels (e.g., sets of light valves 116) may be a one-to-one relationship. That is, there may be an equal number of multiview pixels and multibeam elements 114. FIG. 4B explicitly illustrates by way of example the one-to-one relationship where each multiview pixel comprising a different set of light valves 116 is illustrated as surrounded by a dashed line. In other embodiments (not illustrated), the number of multiview pixels and multibeam elements 114 may differ from one another.

In some embodiments, an inter-element distance (e.g., center-to-center distance) between a pair of adjacent multibeam elements 114 of the multibeam element array may be equal to an inter-pixel distance (e.g., a center-to-center distance) between a corresponding adjacent pair of multiview pixels, e.g., represented by light valve sets. For example, in FIGS. 4A-4B, a center-to-center distance d between the first multibeam element 114-1 and the second multibeam element 114-2 is substantially equal to a center-to-center distance D between the first light valve set 116-1 and the second light valve set 116-2, as illustrated. In other embodiments (not illustrated), the relative center-to-center distances of pairs of multibeam elements 114 and corresponding light valve sets may differ, e.g., the multibeam elements 114 may have an inter-element spacing (i.e., center-to-center distance d) that is one of greater than or less than a spacing (i.e., center-to-center distance D) between light valve sets representing multiview pixels.

In some embodiments, a shape of the multibeam element 114 may be analogous to a shape of the multiview pixel or equivalently, a shape of the set (or 'sub-array') of the light valves 116 corresponding to the multiview pixel. For example, the multibeam element 114 may have a square shape and the multiview pixel (or an arrangement of a corresponding set of light valves 116) may be substantially square. In another example, the multibeam element 114 may have a rectangular shape, i.e., may have a length or longitudinal dimension that is greater than a width or transverse dimension. In this example, the multiview pixel (or equivalently the arrangement of the set of light valves 116) corresponding to the multibeam element 114 may have an analogous rectangular shape. FIG. 4B illustrates a top or plan view of square-shaped multibeam elements 114 and corresponding square-shaped multiview pixels comprising square sets of light valves 116. In yet other examples (not illustrated), the multibeam elements 114 and the corresponding multiview pixels have various shapes including or at least approximated by, but not limited to, a triangular shape, a hexagonal shape, and a circular shape.

Further (e.g., as illustrated in FIG. 4A), each multibeam element 114 may be configured to provide directional light beams 111 to one and only one multiview pixel, according to some embodiments. In particular, for a given one of the multibeam elements 114, the directional light beams 111 having different principal angular directions corresponding to the different views 104 of the multiview image are substantially confined to a single corresponding multiview pixel and the view pixels thereof, i.e., a single set of light valves 116 corresponding to the multibeam element 114 (e.g., as illustrated in FIG. 4A). As such, each multibeam element 114 of the multibeam element-based display 110 provides a corresponding set of directional light beams 111 that has a set of the different principal angular directions corresponding to the different views 104 of the multiview image (i.e., the set of directional light beams 111 contains a light beam having a direction corresponding to each of the different view directions).

According to various embodiments, the multibeam elements 114 may comprise any of a number of different structures configured to couple out a portion of the guided light 113. For example, the different structures may include, but are not limited to, diffraction gratings, micro-reflective elements, micro-refractive elements, or various combinations thereof. In some embodiments, the multibeam element 114 comprising a diffraction grating is configured to diffractively couple out the guided light portion as the plurality of directional light beams 111 having the different principal angular directions. In other embodiments, the multibeam element 114 comprising a micro-reflective element is configured to reflectively couple out the guided light portion as the plurality of directional light beams 111, or the multibeam element 114 comprising a micro-refractive element is configured to couple out the guided light portion as the plurality of directional light beams 111 by or using refraction (i.e., refractively couple out the guided light portion).

Figure 5A:
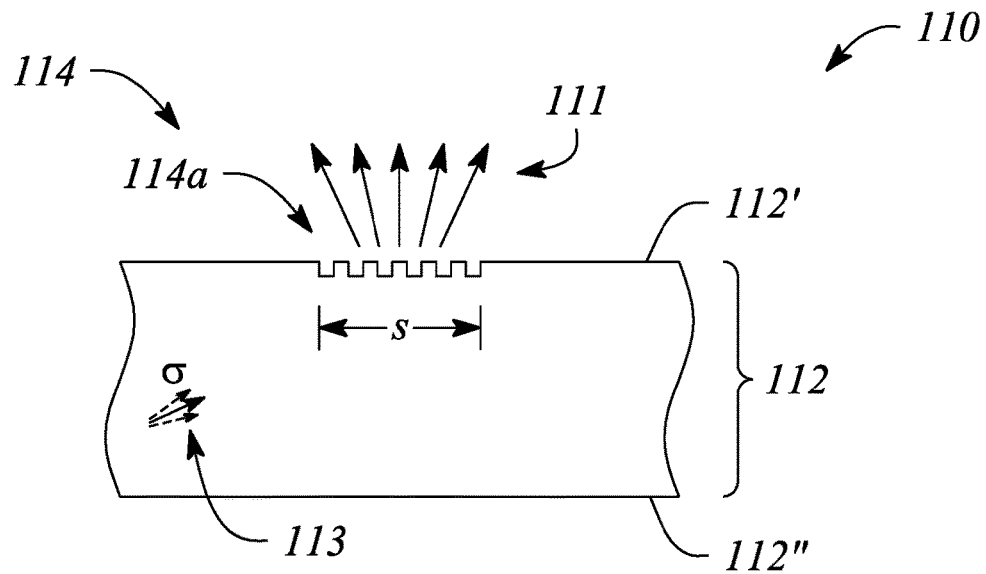
FIG. 5A illustrates a cross sectional view of a portion of a multibeam element-based display including a multibeam element in an example, according to an embodiment consistent with the principles described herein.
Figure 5B:
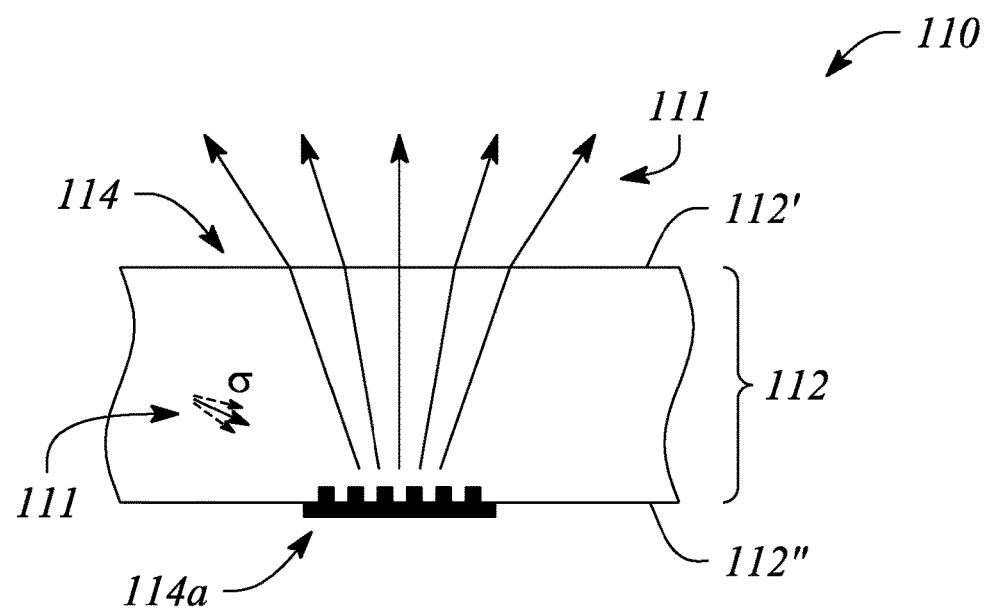
FIG. 5B illustrates a cross sectional view of a portion of a multibeam element-based display including a multibeam element in an example, according to another embodiment consistent with the principles described herein.

FIG. 5A illustrates a cross sectional view of a portion of a multibeam element-based display 110 including a multibeam element 114 in an example, according to an embodiment consistent with the principles described herein. FIG. 5B illustrates a cross sectional view of a portion of a multibeam element-based display 110 including a multibeam element 114 in an example, according to another embodiment consistent with the principles described herein. In particular, FIGS. 5A-5B illustrate the multibeam element 114 of the multibeam element-based display 110 comprising a diffraction grating 114a. The diffraction grating 114a is configured to diffractively couple out a portion of the guided light 113 as the plurality of directional light beams 111. The diffraction grating 114a comprises a plurality of diffractive features spaced apart from one another by a diffractive feature spacing or a diffractive feature or grating pitch configured to provide diffractive coupling out of the guided light portion. According to various embodiments, the spacing or grating pitch of the diffractive features in the diffraction grating 114a may be sub-wavelength (i.e., less than a wavelength of the guided light).

In some embodiments, the diffraction grating 114a of the multibeam element 114 may be located at or adjacent to a surface of the light guide 112. For example, the diffraction grating 114a may be at or adjacent to the first surface 112' of the light guide 112, as illustrated in FIG. 5A. The diffraction grating 114a at light guide first surface 112' may be a transmission mode diffraction grating configured to diffractively couple out the guided light portion through the first surface 112' as the directional light beams 111. In another example, as illustrated in FIG. 5B, the diffraction grating 114a may be located at or adjacent to the second surface 112" of the light guide 112. When located at the second surface 112", the diffraction grating 114a may be a reflection mode diffraction grating. As a reflection mode diffraction grating, the diffraction grating 114a is configured to both diffract the guided light portion and reflect the diffracted guided light portion toward the first surface 112' to exit through the first surface 112' as the diffractively directional light beams 111. In other embodiments (not illustrated), the diffraction grating may be located between the surfaces of the light guide 112, e.g., as one or both of a transmission mode diffraction grating and a reflection mode diffraction grating. Note that, in some embodiments described herein, the principal angular directions of the directional light beams 111 may include an effect of refraction due to the directional light beams 111 exiting the light guide 112 at a light guide surface. For example, FIG. 5B illustrates refraction (i.e., bending) of the directional light beams 111 due to a change in refractive index as the directional light beams 111 cross the first surface 112', by way of example and not limitation. Also see FIGS. 8A and 8B, described below.

According to some embodiments, the diffractive features of the diffraction grating 114a may comprise one or both of grooves and ridges that are spaced apart from one another. The grooves or the ridges may comprise a material of the light guide 112, e.g., may be formed in a surface of the light guide 112. In another example, the grooves or the ridges may be formed from a material other than the light guide material, e.g., a film or a layer of another material on a surface of the light guide 112.

In some embodiments, the diffraction grating 114a of the multibeam element 114 is a uniform diffraction grating in which the diffractive feature spacing is substantially constant or unvarying throughout the diffraction grating 114a. In other embodiments, the diffraction grating 114a may be a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a 'chirp' of or change in the diffractive feature spacing that varies linearly with distance. As such, the chirped diffraction grating is a 'linearly chirped' diffraction grating, by definition. In other embodiments, the chirped diffraction grating of the multibeam element 114 may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 6A:
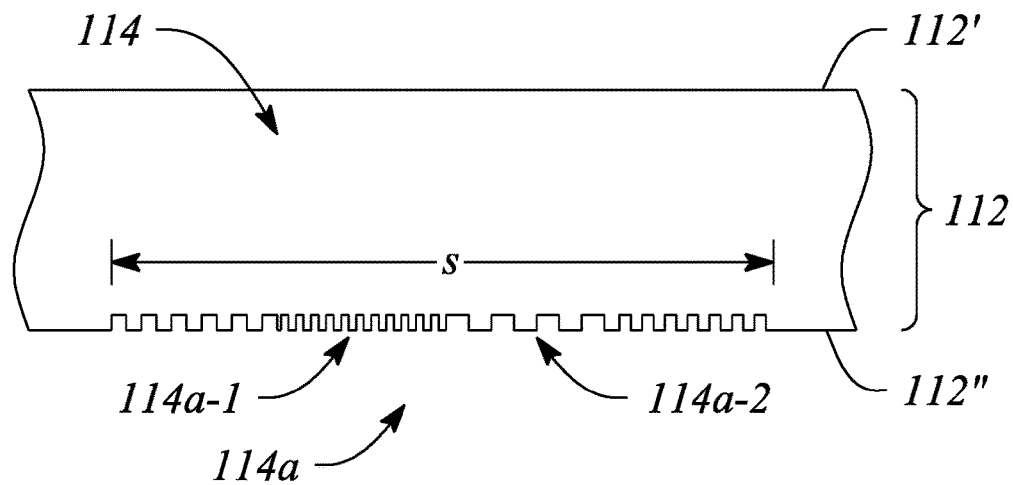
FIG. 6A illustrates a cross sectional view of a diffraction grating comprising a plurality of sub-gratings in an example, according to an embodiment consistent with the principles described herein.
Figure 6B:
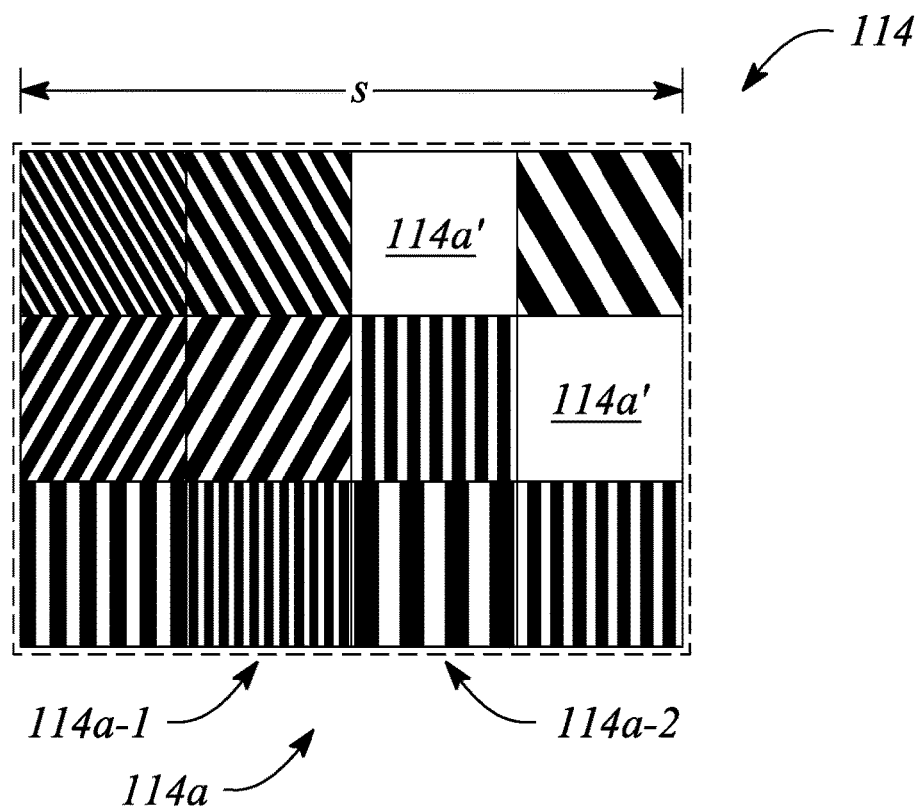
FIG. 6B illustrates a plan view of the diffraction grating illustrated in FIG. 6A in an example, according to an embodiment consistent with the principles described herein.

In some embodiments, the diffraction grating 114a may comprise a plurality of diffraction gratings or equivalently a plurality of sub-gratings. FIG. 6A illustrates a cross sectional view of a diffraction grating 114a comprising a plurality of sub-gratings in an example, according to an embodiment consistent with the principles described herein. FIG. 6B illustrates a plan view of the diffraction grating 114a illustrated in FIG. 6A in an example, according to an embodiment consistent with the principles described herein. The cross sectional view in FIG. 6A may represent a cross section taken from left to right through a bottom row of sub-gratings of the diffraction grating 114a illustrated in FIG. 6B, for example. As illustrated in FIGS. 6A and 6B, the plurality of sub-gratings comprises a first sub-grating 114a-1 and a second sub-grating 114a-2 within the diffraction grating 114a of the multibeam element 114 on a surface (e.g., a second surface 112", as illustrated) of the light guide 112. A size s of the multibeam element 114 is illustrated in both FIGS. 6A and 6B, while a boundary of the multibeam element 114 is illustrated in FIG. 6B using a dashed line.

According to some embodiments, a differential density of sub-gratings within the diffraction grating 114a between different multibeam elements 114 of the multibeam element plurality may be configured to control a relative intensity of the plurality of directional light beams 111 diffractively scattered out by respective different multibeam elements 114. In other words, the multibeam elements 114 may have different densities of diffraction gratings 114a therein and the different densities (i.e., the differential density of the sub-gratings) may be configured to control the relative intensity of the plurality of directional light beams 111. In particular, a multibeam element 114 having fewer sub-gratings within the diffraction grating 114a may produce a plurality of directional light beams 111 having a lower intensity (or beam density) than another multibeam element 114 having relatively more sub-gratings. The differential density of sub-gratings may be provided using locations such as location 114a' illustrated in FIG. 6B within the multibeam element 114 that lack or are without a sub-grating, for example.

Figure 7:
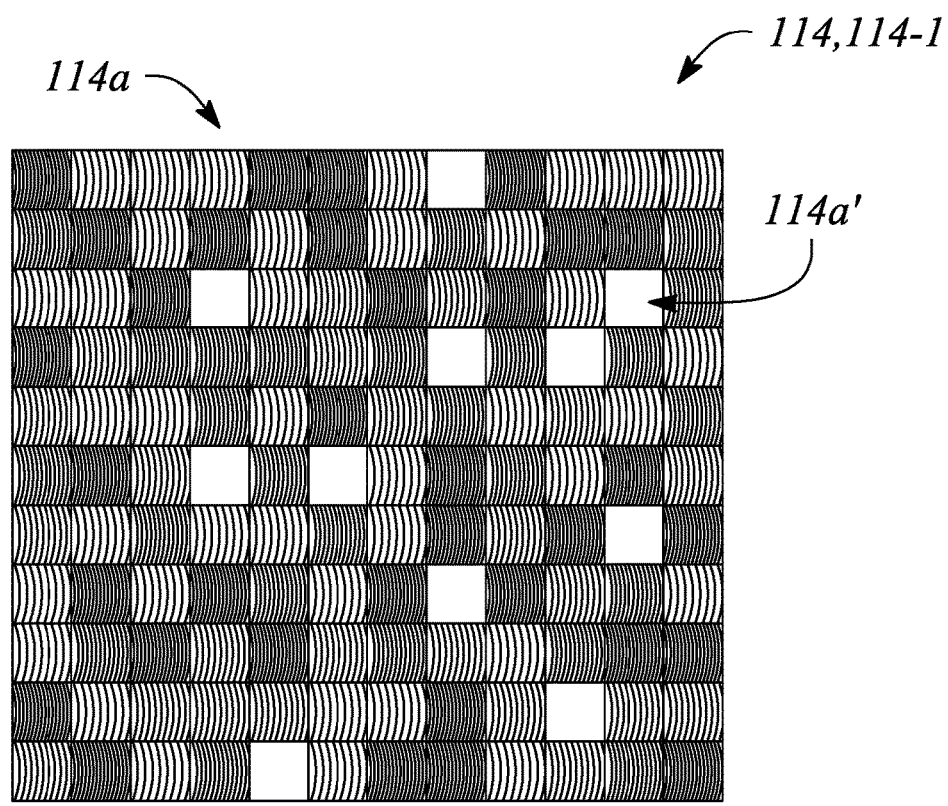
FIG. 7 illustrates a plan view of a pair of multibeam elements in an example, according to an embodiment consistent with the principles described herein.
Figure 7:
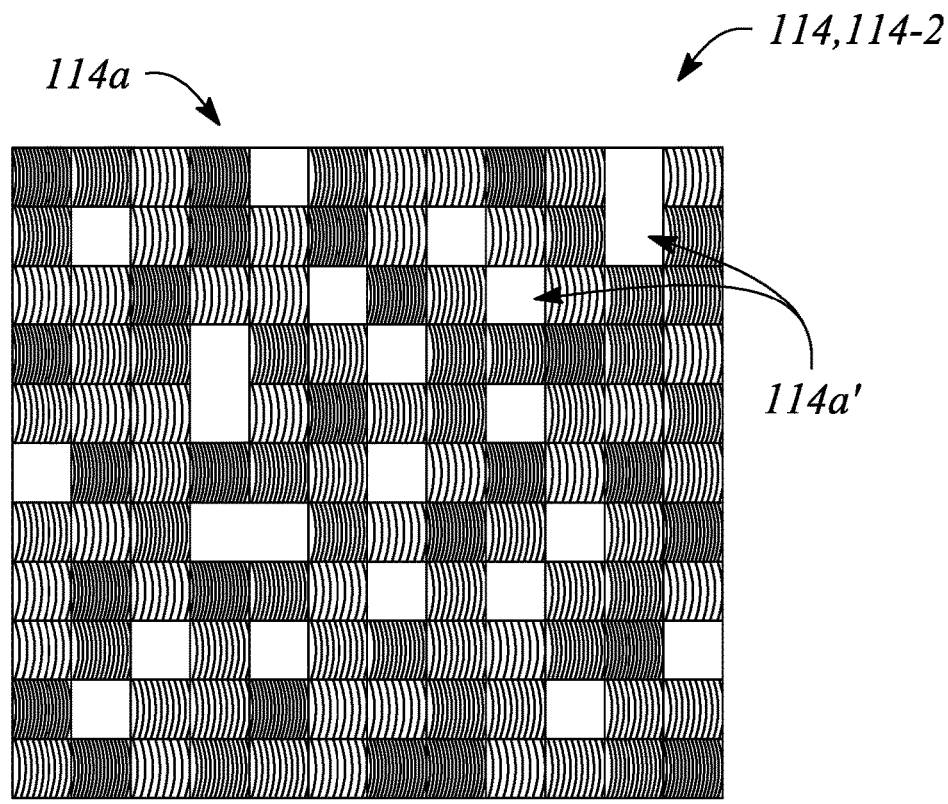

FIG. 7 illustrates a plan view of a pair of multibeam elements 114 in an example, according to an embodiment consistent with the principles described herein. As illustrated, a first multibeam element 114-1 of the pair has a higher density of sub-gratings within the diffraction grating 114a than are present in a second multibeam element 114-2 of the pair. In particular, the second multibeam element 114-2 has a diffraction grating 114a with fewer sub-gratings and more locations 114a' without a sub-grating than the first multibeam element 114-1. In some embodiments, the higher density of sub-gratings in the first multibeam element 114-1 may provide a plurality of directional light beams having a higher intensity than the intensity of the plurality of directional light beams provided by the second multibeam element 114-2. The higher and lower intensities of the respective directional light beam pluralities provided by the differential sub-grating densities illustrated in FIG. 7 may be used to compensate for a change in optical intensity of the guided light within the light guide as a function of propagation distance, according to some embodiments. By way of example and not limitation, FIG. 7 also illustrates diffraction gratings 114a with sub-gratings having curved diffractive features.

Figure 8A:
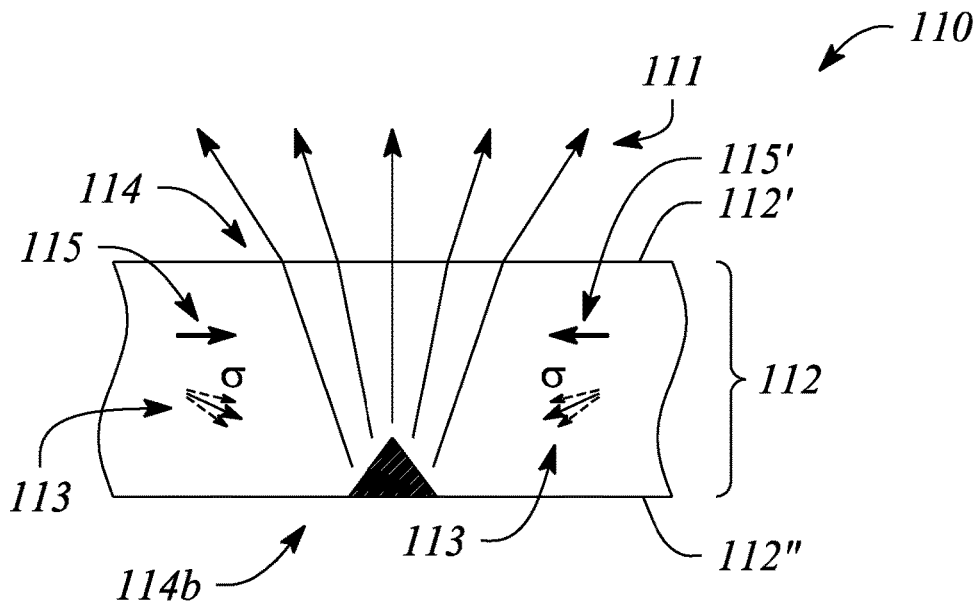
FIG. 8A illustrates a cross sectional view of a portion of a multibeam element-based display including a multibeam element in an example, according to another embodiment consistent with the principles described herein.
Figure 8B:
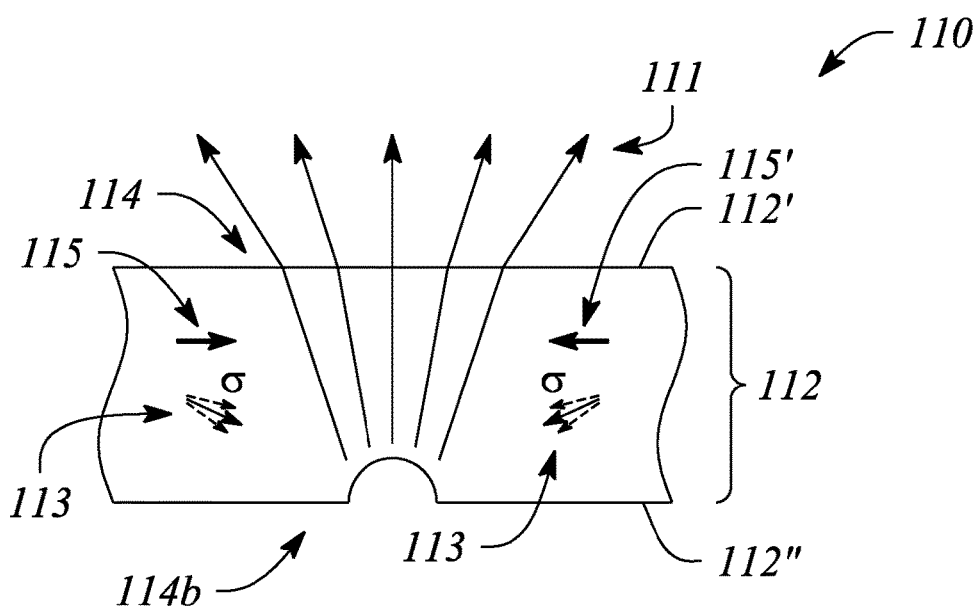
FIG. 8B illustrates a cross sectional view of a portion of a multibeam element-based display including a multibeam element in an example, according to another embodiment consistent with the principles described herein.

FIG. 8A illustrates a cross sectional view of a portion of a multibeam element-based display 110 including a multibeam element 114 in an example, according to another embodiment consistent with the principles described herein. FIG. 8B illustrates a cross sectional view of a portion of a multibeam element-based display 110 including a multibeam element 114 in an example, according to another embodiment consistent with the principles described herein. In particular, FIGS. 8A and 8B illustrate various embodiments of the multibeam element 114 comprising a micro-reflective element. Micro-reflective elements used as or in the multibeam element 114 may include, but are not limited to, a reflector that employs a reflective material or layer thereof (e.g., a reflective metal) or a reflector based on total internal reflection (TIR). According to some embodiments (e.g., as illustrated in FIGS. 8A-8B), the multibeam element 114 comprising the micro-reflective element may be located at or adjacent to a surface (e.g., the second surface 112") of the light guide 112. In other embodiments (not illustrated), the micro-reflective element may be located within the light guide 112 between the first and second surfaces 112', 112".

For example, FIG. 8A illustrates the multibeam element 114 comprising a micro-reflective element 114b having reflective facets (e.g., a 'prismatic' micro-reflective element) located adjacent to the second surface 112" of the light guide 112. The facets of the illustrated prismatic micro-reflective element 114b are configured to reflect (i.e., reflectively scatter) the portion of the guided light 113 out of the light guide 112 as directional light beams 111. The facets may be slanted or tilted (i.e., have a tilt angle) relative to a propagation direction of the guided light 113 to reflect the guided light portion out of light guide 112, for example. The facets may be formed using a reflective material within the light guide 112 (e.g., as illustrated in FIG. 8A) or may be surfaces of a prismatic cavity in the second surface 112", according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments.

In another example, FIG. 8B illustrates the multibeam element 114 comprising a micro-reflective element 114b having a substantially smooth, curved surface such as, but not limited to, a semi-spherical micro-reflective element 114b. A specific surface curve of the micro-reflective element 114b may be configured to reflect the guided light portion in different directions depending on a point of incidence on the curved surface with which the guided light 113 makes contact, for example. As illustrated in FIGS. 8A and 8B, the guided light portion that is reflectively scattered out of the light guide 112 exits or is emitted from the first surface 112', by way of example and not limitation. As with the prismatic micro-reflective element 114b in FIG. 8A, the micro-reflective element 114b in FIG. 8B may be either a reflective material within the light guide 112 or a cavity (e.g., a semi-circular cavity) formed in the second surface 112", as illustrated in FIG. 8B by way of example and not limitation. FIGS. 8A and 8B also illustrate the guided light 113 having two propagation directions 115, 115' (i.e., illustrated as bold arrows), by way of example and not limitation. Using two propagation directions 115, 115' may facilitate providing the plurality of directional light beams 111 with symmetrical principal angular directions, for example.

Figure 9:
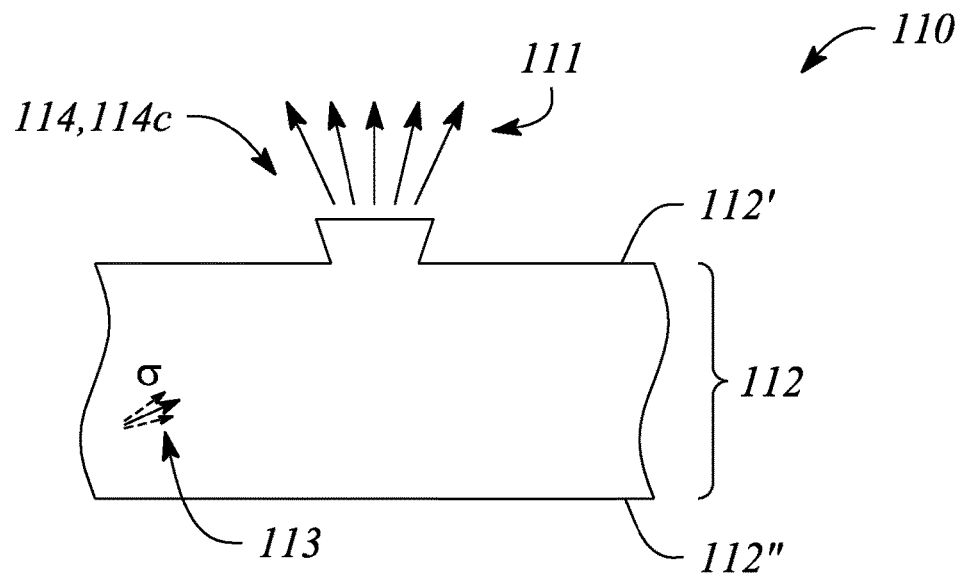
FIG. 9 illustrates a cross sectional view of a portion of a multibeam element-based display including a multibeam element in an example, according to another embodiment consistent with the principles described herein.

FIG. 9 illustrates a cross sectional view of a portion of a multibeam element-based display 110 including a multibeam element 114 in an example, according to another embodiment consistent with the principles described herein. In particular, FIG. 9 illustrates a multibeam element 114 comprising a micro-refractive element 114c. According to various embodiments, the micro-refractive element 114c is configured to refractively couple or scatter out a portion of the guided light 113 from the light guide 112. That is, the micro-refractive element 114c is configured to employ refraction (e.g., refractive coupling as opposed to diffraction or reflection) to couple or scatter out the guided light portion from the light guide 112 as the directional light beams 111, as illustrated in FIG. 9. The micro-refractive element 114c may have various shapes including, but not limited to, a semi-spherical shape, a rectangular shape, a prismatic shape (i.e., a shape having sloped facets) and an inverse prismatic shape (e.g., as illustrated in FIG. 9). According to various embodiments, the micro-refractive element 114c may extend or protrude out of a surface (e.g., the first surface 112') of the light guide 112, as illustrated, or may be a cavity in the surface (not illustrated). Further, the micro-refractive element 114c may comprise a material of the light guide 112, in some embodiments. In other embodiments, the micro-refractive element 114c may comprise another material adjacent to, and in some examples, in contact with the light guide surface.

Referring again to FIG. 4A, the multibeam element-based display 110 may further comprise a light source 118. According to various embodiments, the light source 118 is configured to provide the light to be guided within light guide 112. In particular, the light source 118 may be located adjacent to an entrance surface or end (input end) of the light guide 112. In various embodiments, the light source 118 may comprise substantially any source of light (e.g., optical emitter) including, but not limited to, one or more light emitting diodes (LEDs) or a laser (e.g., laser diode). In some embodiments, the light source 118 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 118 may be a substantially broadband light source configured to provide substantially broadband or polychromatic light. For example, the light source 118 may provide white light. In some embodiments, the light source 118 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 118 may further comprise a collimator (not illustrated). The collimator may be configured to receive substantially uncollimated light from one or more of the optical emitters of the light source 118. The collimator is further configured to convert the substantially uncollimated light into collimated light. In particular, the collimator may provide collimated light having the non-zero propagation angle and being collimated according to a predetermined collimation factor, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 112 to propagate as the guided light 113, described above.

Referring again to FIG. 3, the head-up display 100 further comprises an optical combiner 120. According to various embodiments, the optical combiner 120 is configured to relay the plurality of different views 104 of the multiview image to the eye box 102 of the head-up display 100. The optical combiner 120 is further configured to provide at the eye box 102 a view of a physical environment 106 (or equivalently a 'physical environment view' 106) beyond the optical combiner 120, according to various embodiments. By 'beyond' it is meant, the view of the physical environment is a view visible to a user of a physical environment that is on a side opposite the optical combiner 120 from that of the user. As such, the view of the physical environment 106 'beyond the optical combiner 120' is a view as 'seen through' the optical combiner 120, by definition herein.

FIG. 3 illustrates a cone, a rectangular box and a cylinder as representations of the physical environment 106 by way of example and not limitation. In particular, the optical combiner 120 is configured to combine the multiview image (i.e., including the plurality of different views 104) provided by the multibeam element-based display 110 with the physical environment view 106 as a combined view 108 and then to provide the combined view 108 at the eye box 102. The combined view 108 including both the physical environment view 106 and the plurality of different views 104 of displayed image may be viewed at the eye box 102 by a user, according to various embodiments. The combined view 108 may appear to a user as the displayed image including the different views 104 superposed with the physical environment view 106, for example.

According to some embodiments, the optical combiner 120 comprises a partially reflective surface configured to reflect the plurality of different views 104 of the image toward the eye box 102. In various embodiments, the partially reflective surface may be substantially any surface that provides partial reflection of incident light. For example, the partially reflective surface may be a half-silvered mirror, a beam-splitter or substantially any equivalent thereof. In another example, the partially reflective surface may be a surface (coated or otherwise) of a substantially transparent dielectric material adjacent to air or another dielectric material (i.e., the partially reflective surface may be provided by a change in a refractive index at the surface). The partially reflective surface is further configured to allow or facilitate viewing of the physical environment 106 beyond the optical combiner 120. As such, the partially reflective surface is also partially transparent to light (e.g., from another direction such as from the physical environment 106). In particular, a portion of light from the physical environment 106 is able to pass through the partially reflective surface to combine with light representing the different views 104 as the combined view 108 at the eye box 102, according to various embodiments. In other embodiments, the optical combiner 120 may be another type of optical combiner including, but not limited to, a waveguide or light guide optical combiner.

Figure 10:
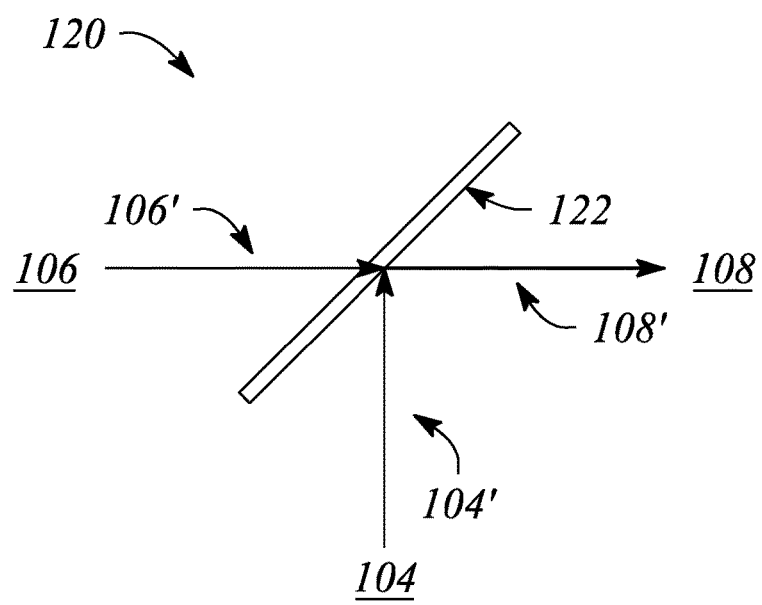
FIG. 10 illustrates a cross sectional view of an optical combiner in an example, according to an embodiment consistent with the principles described herein.

FIG. 10 illustrates a cross sectional view of an optical combiner 120 in an example, according to an embodiment consistent with the principles described herein. In particular, FIG. 10 illustrates an optical combiner 120 comprising a partially reflective surface 122. Light 104' incident on the partially reflective surface 122 from the multibeam element-based display 110 (not illustrated in FIG. 10) and representing the different views 104 of the displayed image is reflected by the partially reflective surface 122 in a direction represented by arrow pointing away from the partially reflective surface 122 (i.e., that is toward the eye box 102 (not illustrated in FIG. 10)). Also, as illustrated, light 106' from the physical environment 106 representing a view (comprising images) of the physical environment passes through the partially reflective surface 122 to be combined with the reflected light 104' as combined light 108'. The combined light 108' forms the combined view 108 (e.g., at the eye box 102, as illustrated in FIG. 3). As mentioned above, the combined view 108 is a superposition of the different views 104 of the displayed image and the physical environment view 106.

In some embodiments, the optical combiner 120 may comprise a portion of a viewport, window or windshield of a vehicle such as, but not limited to an automobile, a recreational vehicle, a utility vehicle, a military vehicle, an aircraft, a spacecraft, or a marine craft, e.g., a ship, a boat etc. In particular, in embodiments where the vehicle is an automobile, the head-up display 100 may be referred to as an automotive head-up display 100. Herein, 'automobile' and 'windshield' are employed for simplicity of discussion purposes and not by way of limitation. In some embodiments, the portion of the windshield may be a material of the windshield itself (e.g., glass, acrylic glass, polycarbonate, etc. of the windshield). In other embodiments, the windshield portion may be a layer or material film applied or affixed to a surface of the windshield material. For example, the optical combiner 120 comprising the partially reflective surface 122 may comprise a partially reflective metal layer (e.g., aluminum, silver, gold, etc.) deposited on the surface of the windshield material. In another example, the partially reflective surface 122 may be a partially reflective film (e.g., partially metalized Mylar® film) applied to a surface of the windshield material to serve as the optical combiner 120. Mylar® is a registered trademark of Dupont De Nemours and Company Corporation, Wilmington, Del., U.S.

Figure 11:
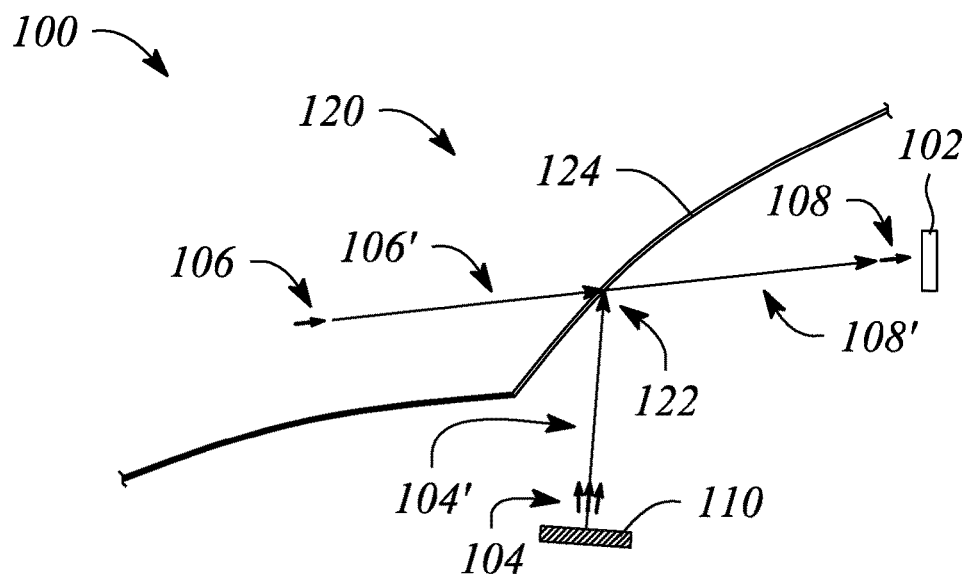
FIG. 11 illustrates a schematic diagram of an automotive head-up display in an example, according to an embodiment consistent with the principles described herein.

FIG. 11 illustrates a schematic diagram of an automotive head-up display 100 in an example, according to an embodiment consistent with the principles described herein. The automotive head-up display 100 comprises the multibeam element-based display 110 configured to generate the different views 104 of the image. The automotive head-up display 100 further comprises an optical combiner 120. As illustrated, the optical combiner 120 comprises a portion of a windshield 124 of an automobile (not illustrated) that serves as or includes a partially reflective surface 122. Light 104' representing the different views 104 is relayed from the multibeam element-based display 110 to the optical combiner 120 at the automobile windshield 124. The light 104' is reflected by the optical combiner 120 toward the eye box 102. In addition, light 106' from the physical environment 106 outside of the automobile (i.e., the view through the windshield) is combined with the light 104' reflected by the optical combiner 120 as the combined view 108 at the eye box 102. The combined view 108 may be viewed at the eye box 102 by a user (e.g., by a driver or a passenger of the automobile). The combined view 108 comprises a view of from the physical environment 106 superposed with the image represented by the different views 104 from the multibeam element-based display 110.

Figure 12:
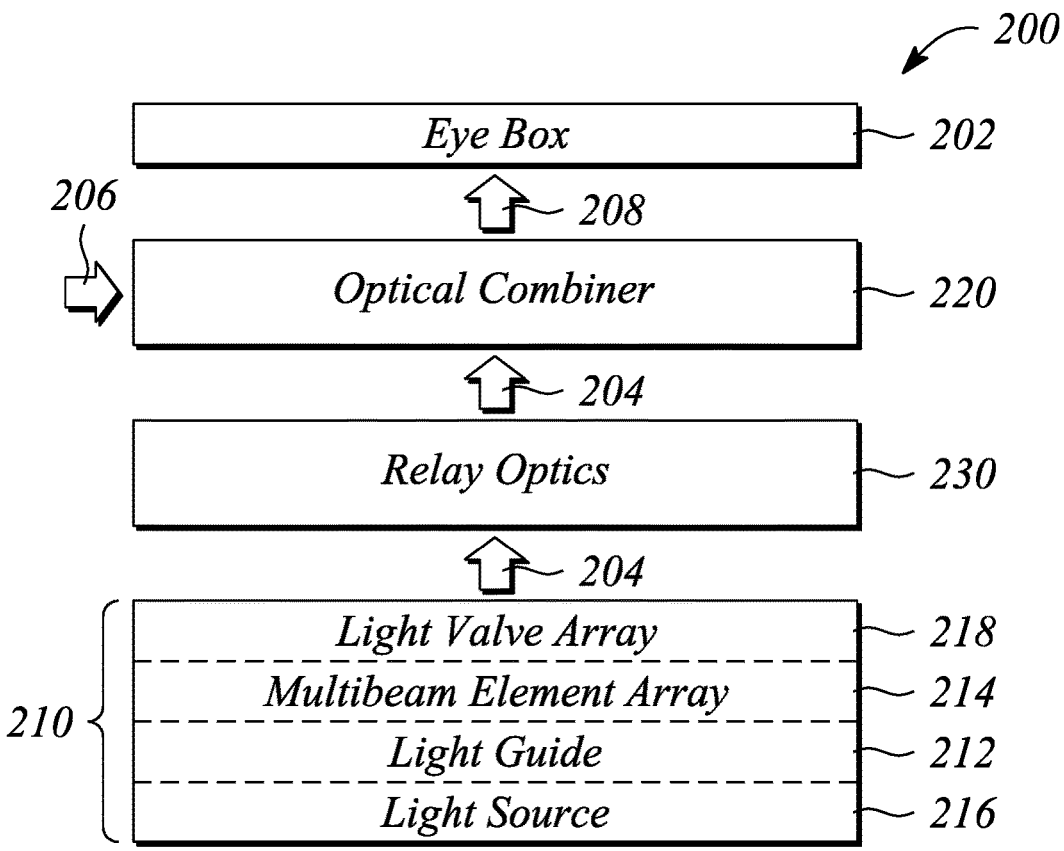
FIG. 12 illustrates a block diagram of a multiview head-up display system in an example, according to an embodiment consistent with the principles described herein.

In accordance with some embodiments of the principles described herein, a multiview head-up display system is provided. FIG. 12 illustrates a block diagram of a multiview head-up display system 200 in an example, according to an embodiment consistent with the principles described herein. The multiview head-up display system 200 of FIG. 12 is configured to provide a multiview image to an eye box 202 for viewing by a user. According to various embodiments, the multiview image comprises a plurality of different views 204 (e.g., different perspective views). Further, the multiview image may be viewed by the user at the eye box 202 along with a view of a physical environment 206 (or equivalently a 'physical environment view' 206) as a combined view 208. Moreover, the combined view 208 may be viewed by the user in a so-called 'head-up' manner, according to various embodiments.

As illustrated in FIG. 12, the multiview head-up display system 200 comprises a multibeam element-based display 210. The multibeam element-based display 210 is configured to provide the multiview image comprising the plurality of different views 204. In particular, the multibeam element-based display 210 may be a multiview or autostereoscopic display configured to provide multiview images, for example. In some embodiments, the multibeam element-based display 210 may be substantially similar to the multibeam element-based display 110 described above with respect to the head-up display 100.

In particular and as illustrated, the multibeam element-based display 210 comprises a light guide 212. The light guide 212 is configured to guide light as guided light. The guided light may be a collimated light beam and may be guided at a non-zero propagation angle, for example. According to some embodiments, the light guide 212 may be substantially similar to the light guide 112 of the multibeam element-based display 110, described above.

Further, the multibeam element-based display 210 illustrated in FIG. 12 comprises a multibeam element array 214. The multibeam element array 214 is configured to scatter out a portion of the guided light as a plurality of directional light beams having principal angular directions corresponding to view directions of the plurality of different views 204. In some embodiments, a multibeam element of the multibeam element array 214 may be substantially similar to the array of multibeam elements 114 described above with respect to the multibeam element-based display 110 of the head-up display 100. For example, a multibeam element of the multibeam element array 214 may comprise one or more of a diffraction grating, a micro-reflective element and a micro-refractive element optically connected to the light guide 212 to scatter out the portion of the guided light. The diffraction grating, a micro-reflective element and a micro-refractive element may be substantially similar to the diffraction grating 114a, micro-reflective element 114b and micro-refractive element 114c, also described above. Further, the multibeam element of the multibeam element array 214 may be configured to provide angle-preserving scattering of the guided light portion, in some embodiments.

In some embodiments, the multibeam element-based display 210 may further comprise a light source 216 and a light valve array 218, as illustrated in FIG. 12. For example, the light source 216 may be configured to provide light to the light guide 212 as the guided light. In some embodiments, the light source 216 may comprise an optical emitter to emit light and a collimator to convert the emitted light into a collimated light beam as the provided light. In some embodiments, the light source 216 may be substantially similar to the light source 118 of the above-described multibeam element-based display 110.

According to various embodiments, the light valve array 218 is configured to selectively modulate directional light beams of the plurality of directional light beams as pixels representing the different views 204 of the provided multiview image. In some embodiments, the light valve array 218 may be substantially similar to the array of light valves 116, described above with respect to the multibeam element-based display 110. For example, the light valve array 218 may comprise any of a variety of light valves including, but not limited to, a liquid crystal light valve and an electrowetting light valve. Further, a size of the multibeam element of the multibeam element array 214 is comparable to a size of a light valve in the light valve array 218 of the multibeam element-based display 210, according to some embodiments.

The multiview head-up display system 200 illustrated in FIG. 12 further comprises an optical combiner 220. The optical combiner 220 is configured to relay the multiview image to the eye box 202 of the multiview head-up display system 200. Further, the optical combiner 220 is configured to provide at the eye box 202 the combined view 208 including the multiview image and the physical environment view 206 (e.g., beyond the optical combiner 220). In other words, the optical combiner 220 is configured to combine the multiview image including the different views 204 with the physical environment view 206 and to provide the combined view 208 to the eye box 202. In some embodiments, the optical combiner 220 may be substantially similar to the optical combiner 120 of the head-up display 100, described above.

In particular, in some embodiments, the optical combiner 220 comprises one of a partially reflective surface and a substantially transparent light guide configured to relay the provided multiview image to the eye box 202 of the multiview head-up display system 200. The partially reflective surface and the substantially transparent light guide are each configured to facilitate viewing the physical environment through a respective one of the partially reflective surface and the substantially transparent light guide, according to various embodiments. In some embodiments, the optical combiner 220 may comprise a portion of a windshield of a vehicle. The vehicle may include, but is not limited to, an automobile, an aircraft and a boat, for example. As such, the multiview head-up display system 200 may be a vehicular head-up display system, according to some embodiments. For example the multiview head-up display system 200 may be an automotive head-up display system, an aircraft head-up display system, or etc., according to various embodiments.

In some embodiments (e.g., as illustrated in FIG. 12), the multiview head-up display system 200 further comprises relay optics 230. The relay optics 230 may be located between the multibeam element-based display 210 and the optical combiner 220. The relay optics 230 is configured to relay light of or corresponding to the multiview image (e.g., including and illustrated as the different views 204) from the multibeam element-based display 210 to the optical combiner 220. In some embodiments, the relay optics 230 include collimating optics such as, but not limited to, one or both of a lens and a reflector. The lens and the reflector may be configured to both relay and collimate light from the multibeam element-based display 210, for example. As such, the lens and the reflector of the relay optics 230 that provide collimation may be referred to as a collimating lens and a collimating reflector, respectively. Collimation of the light may provide focusing of light representing the different views 204 at the eye box 202, for example.

Figure 13:
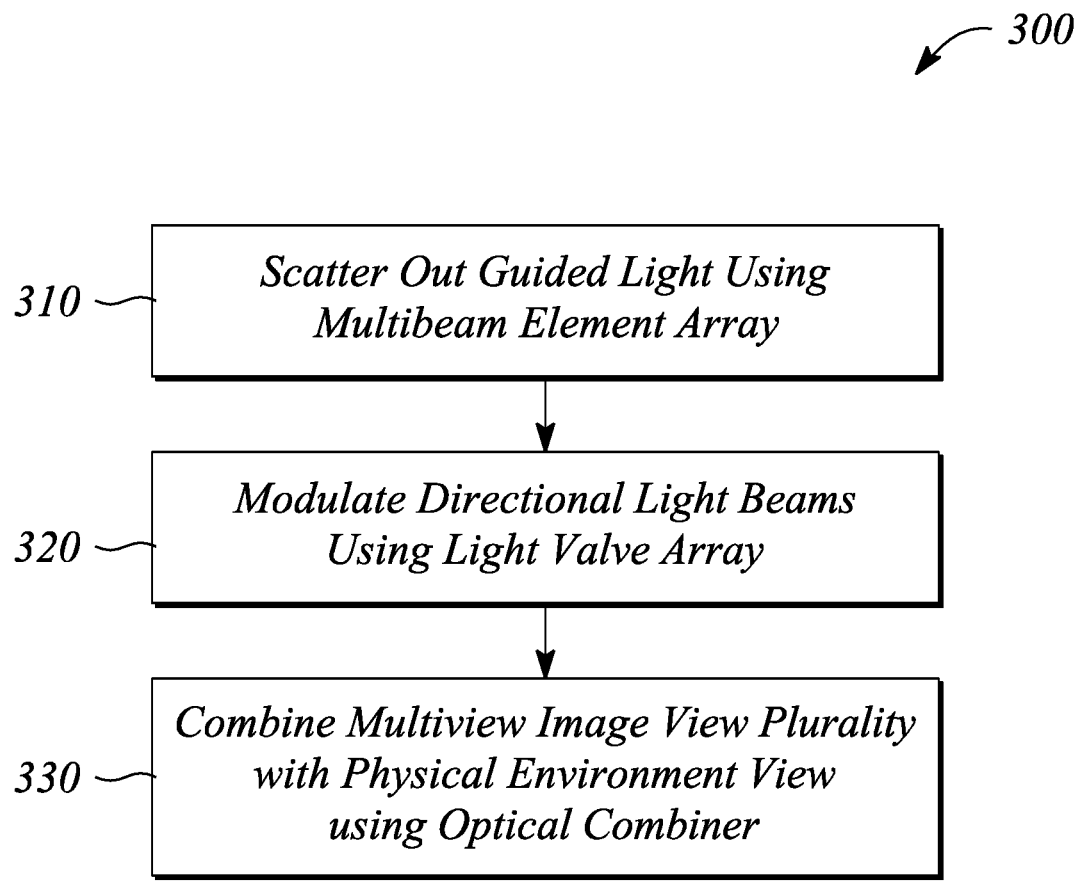
FIG. 13 illustrates a flow chart of a method of head-up display operation in an example, according to an embodiment consistent with the principles described herein.

In accordance with other embodiments of the principles described herein, a method of head-up display operation is provided. FIG. 13 illustrates a flow chart of a method 300 of head-up display operation in an example, according to an embodiment consistent with the principles described herein. As illustrated in FIG. 13, the method 300 of head-up display operation comprises scattering out 310 a portion of guided light from a light guide using an array of multibeam elements to produce a plurality of directional light beams having principal angular directions corresponding to view directions of a multiview image. According to some embodiments, the light guide and array of multibeam elements may be substantially similar to the light guide 112 and array of multibeam elements 114 of the multibeam element-based display 110, describe above with respect to the head-up display 100. For example, scattering out 310 the portion of guided light may comprise diffractively scattering out the portion of guided light using a multibeam element of the array of multibeam elements comprising a diffraction grating. Further, scattering out 310 the portion of guided light may comprise reflectively scattering out the guided light portion using a multibeam element of the array of multibeam elements comprising a micro-reflective element. Further, scattering out 310 the portion of guided light may comprise refractively scattering out the guided light portion using a multibeam element of the array of multibeam elements comprising a micro-refractive element.

The method 300 of head-up display operation illustrated in FIG. 13 further comprises modulating 320 directional light beams of the plurality of directional light beams using an array of light valves to provide the multiview image. In some embodiments, the array of light valves may be substantially similar to the array of light valves 116 of the multibeam element-based display 110 of the head-up display 100, as described above.

As illustrated in FIG. 13, the method 300 of head-up display operation further comprises combining 330 the plurality of different views of the multiview image with a view of a physical environment using an optical combiner to form a combined view. In particular, the physical environment is a view beyond and viewed through the optical combiner. In some embodiments, the optical combiner may be substantially similar to the optical combiner 120 described above with respect to the head-up display 100. For example, the optical combiner may comprise a partially reflective surface (e.g., a partially reflective portion of a windshield). In some embodiments, the optical combiner comprises a portion of a windshield of a vehicle.

According to various embodiments, the method 300 of multiview head-up display operation relays the combined view (or equivalently 'combined image') to an eye box. The eye box may be substantially similar to the eye box 102 of the head-up display 100, described above. In particular, the eye box may be a location at which the relayed combined view, which includes both the physical environment view and the different views of the multiview image, is viewed by a user. According to various embodiments, the user viewing the combined view may perceive the multiview image and the view of the physical environment simultaneously or superposed as the combined view.

Thus, there have been described examples and embodiments of a head-up display, a multiview head-up display system and a method of head-up display operation that employ a multibeam element-based display to provide a plurality of different views of a multiview image, and further that provide a superposition of a physical environment view and the multiview image in an eye box. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A head-up display comprising:
a multibeam element-based display configured to provide a plurality of different views of a multiview image, the multibeam element-based display comprising an array of multibeam elements configured to provide a plurality of directional light beams having directions corresponding to respective view directions of the plurality of different views and an array of light valves configured to modulate the plurality of directional light beams to provide the multiview image; and
an optical combiner configured to relay the multiview image to an eye box of the head-up display, the optical combiner being further configured to provide at the eye box a combined view comprising the multiview image and a view of a physical environment beyond the optical combiner,
wherein a size of a multibeam element of the array of multibeam elements is between fifty percent and two hundred percent of a size of a light valve of the array of light valves.

2. The head-up display of claim 1, wherein the multibeam element-based display further comprises a light guide configured to guide light along a length of the light guide as guided light, a multibeam element of the multibeam element array being configured to scatter out from the light guide a portion of the guided light as directional light beams of the plurality of directional light beams.

3. The head-up display of claim 2, wherein the multibeam element comprises a diffraction grating configured to diffractively scatter out the portion of the guided light.

4. The head-up display of claim 2, wherein the multibeam element comprises one or both of a micro-reflective element and a micro-refractive element, the micro-reflective element being configured to reflectively scattering out the portion of the guided light, the micro-refractive element being configured to refractively scattering out the portion of the guided light.

5. The head-up display of claim 2, wherein the multibeam element is located one of at a first surface and at a second surface of the light guide, the multibeam element being configured to scatter out the portion of the guided light through the first surface.

6. The head-up display of claim 2, wherein the multibeam element-based display further comprises a light source optically coupled to an input of the light guide, the light source being configured to provide light to be guided as the guided light one or both of having a non-zero propagation angle and being collimated according to a predetermined collimation factor.

7. The head-up display of claim 1, wherein the optical combiner comprises a partially reflective surface configured to reflect the plurality of different views of the multiview image toward the eye box and further configured to transmit the view of the physical environment through the partially reflective surface to the eye box.

8. The head-up display of claim 1, wherein the optical combiner comprises a portion of a windshield of an automobile, the head-up display being an automotive head-up display.

9. A multiview head-up display system comprising:
a multibeam element-based display configured to provide a multiview image comprising a plurality of different views, the multibeam element-based display comprising a light guide configured to guide light as guided light and a multibeam element array configured to scatter out a portion of the guided light as a plurality of directional light beams having principal angular directions corresponding to view directions of the plurality of different views; and
an optical combiner configured to relay the multiview image to an eye box of the multiview head-up display system and to combine within the eye box a view of the multiview image and a view of a physical environment beyond the optical combiner,
wherein a size of a multibeam element of the array of multibeam elements is between fifty percent and two hundred percent of a size of a light valve of the array of light valves.

10. The multiview head-up display system of claim 9, wherein a multibeam element of the multibeam element array comprises one or more of a diffraction grating, a micro-reflective element and a micro-refractive element optically connected to the light guide to scatter out the portion of the guided light.

11. The multiview head-up display system of claim 10, wherein the multibeam element of the multibeam element array is configured to provide angle-preserving scattering of the guided light portion.

12. The multiview head-up display system of claim 9, wherein the multibeam element-based display further comprises:
a light source configured to provide light to the light guide as the guided light; and
a light valve array configured to selectively modulate directional light beams of the directional light beam plurality, the selectively modulated directional light beams representing pixels of different views of the multiview image,
wherein the guided light has a predetermined collimation factor, the multibeam element of the multibeam element array being located adjacent to a surface of the light guide.

13. The multiview head-up display system of claim 12, wherein the light valve array comprises a plurality of liquid crystal light valves.

14. The multiview head-up display system of claim 9, wherein the optical combiner comprises one of a partially reflective surface and a transparent light guide configured to relay the multiview image to the eye box, the partially reflective surface and the transparent light guide each being configured to facilitate viewing the physical environment through a respective one of the partially reflective surface and the transparent light guide.

15. The multiview head-up display system of claim 9, wherein the optical combiner comprises a portion of a windshield of a vehicle, the multiview head-up display system being a vehicular head-up display system.

16. The multiview head-up display system of claim 9, further comprising relay optics between the multibeam element-based display and the optical combiner, the relay optics being configured to relay light corresponding to the multiview image from the multibeam element-based display to the optical combiner.

17. A method of head-up display operation, the method comprising:
   scattering out a portion of guided light from a light guide using an array of multibeam elements to produce a plurality of directional light beams having principal angular directions corresponding to view directions of a multiview image;
   modulating directional light beams of the plurality of directional light beams using an array of light valves to provide the multiview image; and
   combining the multiview image with a view of a physical environment using an optical combiner to form a combined view, the physical environment being viewed through the optical combiner,
   wherein a size of a multibeam element of the multibeam element array is between fifty percent and two hundred percent of a size of a light valve of the light valve array.

18. The method of head-up display operation of claim 17, wherein scattering out the portion of guided light comprises one or more of:
   diffractively scattering out the portion of guided light using a multibeam element of the array of multibeam elements comprising a diffraction grating;
   reflectively scattering out the guided light portion using a multibeam element of the array of multibeam elements comprising a micro-reflective element; and
   refractively scattering out the guided light portion using a multibeam element of the array of multibeam elements comprising a micro-refractive element.

19. The method of head-up display operation of claim 17, wherein the optical combiner comprises a portion of a windshield of a vehicle.

* * * * *